(No Model.)
J. W. CAMPBELL.
JOINT FOR BAR STRUCTURES.
No. 494,733. Patented Apr. 4, 1893.
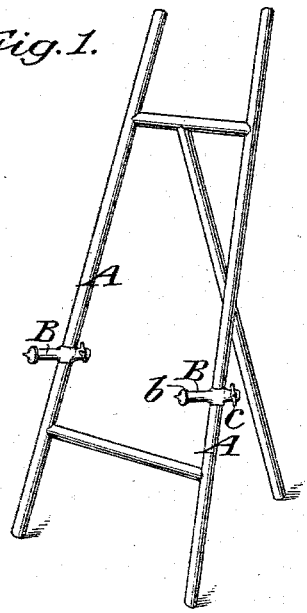
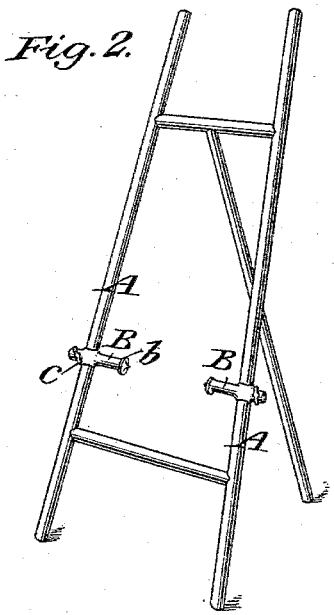
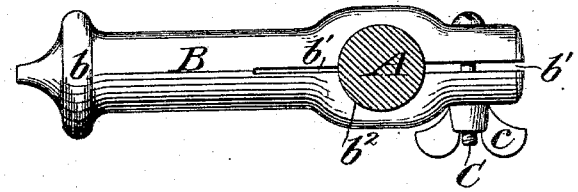
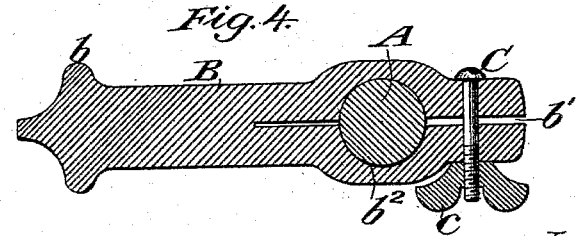
Witnesses:—
Inventor:—
James W. Campbell
by attorneys
Brown & Seward

UNITED STATES PATENT OFFICE.

JAMES W. CAMPBELL, OF GERMANTOWN, ASSIGNOR TO FERGUSON BROTHERS, OF NEW YORK, N. Y.

JOINT FOR BAR STRUCTURES.

SPECIFICATION forming part of Letters Patent No. 494,733, dated April 4, 1893.

Application filed January 4, 1893. Serial No. 457,219. (No model.)

*To all whom it may concern:*

Be it known that I, JAMES W. CAMPBELL, of Germantown, in the county of Columbia and State of New York, have invented a new and useful Improvement in Joints for Bar Structures, of which the following is a specification.

My invention relates to an improvement in joints for bar structures and more particularly in joints for wooden structures for uniting an adjustable part to a leg or standard in any desired position throughout the length of the leg or standard and in any desired angle in a plane transverse to the leg or standard.

I have chosen to illustrate my invention an easel in which the joint which forms the subject matter of my present invention is utilized to secure the supporting brackets of the easel to the legs or standards.

In the accompanying drawings, Figure 1 represents an easel with the supporting brackets in position for use. Fig. 2 is a view of the same showing the brackets turned inwardly as for packing for shipment. Fig. 3 is a top plan view in detail of the bracket, showing the standard or leg in section, and Fig. 4 is a longitudinal section through the bracket and joint in the plane of the clamping device.

A denotes one of the legs or standards of the easel. The body portion of the supporting bracket is denoted by B, its end farthest from the standard being here shown as provided with a rib or shoulder $b$ to retain the article resting thereon. The end of the bracket toward the leg or standard is split, as for example by a saw cut $b'$, the split extending from the extreme end of the bracket to a point in the body of the bracket a considerable distance, an inch more or less, from the leg or standard A. The bracket is provided with an opening $b^2$ therethrough for the passage of the leg or standard A, the said opening being sufficiently far from the split end of the bracket to admit of the attachment of a clamping device. That portion of the bracket in the neighborhood of the opening $b^2$ is preferably enlarged to afford sufficient strength of wall, when, as in the present illustration, the body of the bracket is of the same size as the leg or standard. The clamping device is here shown as a screw C extending through the split end of the bracket transversely to the cut and provided upon its screw threaded end with a thumb nut $c$.

The bracket may be made of wood, bone, celluloid, hard rubber, metal or any material having sufficient resiliency to admit of springing the branches of its split end together about the leg or standard. I prefer to make it of wood and its clamp of brass.

The parts may be assembled by slipping bracket on the end of the leg or standard and thence along to the position which it is intended to occupy, and then securing it by turning the nut $c$ on the screw C to spring the branches of the split end together to cause them to tightly hug the leg or standard. By carrying the cut to a considerable distance away from the standard, the branches will be afforded additional resiliency which will effectually prevent them from splitting the body portion when tightly clamped.

The structure is of great convenience in packing the easels for shipment as it permits of slightly loosening the brackets and then swinging them into the position shown in Fig. 2 between, and in the plane of, the legs or standards, without any loose parts to become lost or misplaced.

What I claim is—

1. The combination with a leg or standard, of a bar extending transversely to the leg or standard and having an opening therethrough to receive the leg or standard, the said transversely extending bar having its end split through to the opening, and a device for drawing the branches of the split end together to clamp the bar to the leg or standard, substantially as set forth.

2. The combination with a leg or standard, of a bar extending transversely to the leg or standard and having its end split, the said bar having an opening therethrough located intermediate of the ends of the cut which splits the bar for the reception of the leg or standard, and a clamping device engaged with the branches of the split end of the bar, substantially as set forth.

JAMES W. CAMPBELL.

Witnesses:
 FREDK. HAYNES,
 D. H. HAYWOOD.